United States Patent
Han et al.

(10) Patent No.: US 11,639,089 B2
(45) Date of Patent: May 2, 2023

(54) RADIANT HEATING DUAL ROLLER SHADE FOR VEHICLE SUNROOF SYSTEM

(71) Applicant: GM GLOBAL TECHNOLOGY OPERATIONS LLC, Detroit, MI (US)

(72) Inventors: Taeyoung Han, Bloomfield Hills, MI (US); Kuo-huey Chen, Troy, MI (US); Bahram Khalighi, Birmingham, MI (US); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 218 days.

(21) Appl. No.: 16/750,559

(22) Filed: Jan. 23, 2020

(65) Prior Publication Data

US 2021/0229534 A1 Jul. 29, 2021

(51) Int. Cl.
 *B60J 7/00* (2006.01)
 *B60J 1/20* (2006.01)

(52) U.S. Cl.
 CPC ........... *B60J 7/0023* (2013.01); *B60J 1/2016* (2013.01); *B60J 1/2069* (2013.01); *B60J 7/0015* (2013.01); *B60J 1/2019* (2013.01)

(58) Field of Classification Search
 CPC ...... B60J 1/2016; B60J 1/2069; B60J 1/2019; B60J 1/2013; B60J 1/2041; B60J 7/0023; B60J 7/0015; E06B 2009/2447; E06B 2009/2452; E06B 2009/2423; E06B 2009/6818; E06B 2009/6809
 See application file for complete search history.

(56) References Cited

U.S. PATENT DOCUMENTS

| | | | | |
|---|---|---|---|---|
| 1,743,638 A | * | 1/1930 | Clyde | H05B 3/84 219/541 |
| 2,660,659 A | * | 11/1953 | Sarno | F24C 7/043 439/4 |
| 2,702,081 A | * | 2/1955 | North | A47H 23/06 160/120 |
| 3,990,635 A | * | 11/1976 | Restle | F24S 20/63 126/591 |

(Continued)

FOREIGN PATENT DOCUMENTS

| | | | |
|---|---|---|---|
| CN | 206438969 U | 8/2017 | |
| FR | 2971290 A1 | * 8/2012 | ............. A47H 23/08 |

OTHER PUBLICATIONS

U.S. Appl. No. 15/953,736, filed Apr. 16, 2018, Chen et al.

(Continued)

*Primary Examiner* — Abe Massad (57) ABSTRACT

A radiant heating and blocking shade system for a sunroof of a vehicle includes a first roller configured to be mounted adjacent to one end of a sunroof of a vehicle. A second roller is mounted adjacent to the first roller between the first roller and the sunroof. A radiant heating shade is at least partially wound around the first roller. The radiant heating shade has a deployed position and a retracted position. A blocking shade is at least partially wound around the second roller. The blocking shade has a deployed position and a retracted position. The blocking shade is arranged parallel to and spaced from the radiant heating shade between the radiant heating shade and the sunroof when the blocking shade and the radiant heating shade are in the deployed position.

17 Claims, 5 Drawing Sheets

(56) References Cited

U.S. PATENT DOCUMENTS

| | | | | |
|---|---|---|---|---|
| 4,610,293 A | * | 9/1986 | Weiblen | E06B 9/24 160/120 |
| 4,813,198 A | * | 3/1989 | Johnston | B60J 1/2041 160/241 |
| 4,925,238 A | * | 5/1990 | Thaler | B60J 7/0015 160/267.1 |
| 5,250,882 A | * | 10/1993 | Odoi | B60J 7/0573 296/223 |
| 5,443,923 A | * | 8/1995 | Laniado | B60J 1/2041 156/229 |
| 6,407,365 B1 | * | 6/2002 | De Prete, III | B60J 1/2011 160/DIG. 3 |
| 6,520,239 B2 | * | 2/2003 | Schlecht | B60J 1/2069 160/120 |
| 6,592,178 B2 | * | 7/2003 | Schober | B60J 7/0015 180/271 |
| 6,695,381 B2 | * | 2/2004 | Schlecht | B60J 1/208 296/97.4 |
| 6,713,733 B2 | * | 3/2004 | Kochman | H05B 3/58 219/494 |
| 6,840,562 B2 | * | 1/2005 | Schlecht | B60J 1/2027 296/97.9 |
| 6,915,988 B2 | * | 7/2005 | Sanz | B60J 1/2041 160/23.1 |
| 8,813,809 B2 | * | 8/2014 | Braggs | A47H 1/02 160/330 |
| 9,539,878 B2 | * | 1/2017 | Nakajima | B60H 1/00785 |
| 9,850,705 B2 | * | 12/2017 | Dean | E06B 9/68 |
| 2002/0100562 A1 | * | 8/2002 | Ikle | E06B 9/40 160/120 |
| 2004/0066059 A1 | * | 4/2004 | Schlecht | B60J 1/2019 296/138 |
| 2006/0082192 A1 | * | 4/2006 | Dubay | B60J 1/2011 296/214 |
| 2009/0277593 A1 | * | 11/2009 | Stewart | E06B 9/40 160/127 |
| 2014/0130990 A1 | * | 5/2014 | Wong | B60J 1/2013 160/309 |
| 2015/0129140 A1 | | 5/2015 | Dean et al. | |
| 2015/0261219 A1 | * | 9/2015 | Cuddihy | B60J 1/2016 701/23 |
| 2016/0270158 A1 | * | 9/2016 | Tefft | H05B 3/342 |
| 2016/0374148 A1 | * | 12/2016 | Chi-Hsueh | H05B 3/347 |
| 2019/0001793 A1 | * | 1/2019 | Zeidan | B60J 1/2069 |

OTHER PUBLICATIONS

U.S. Appl. No. 15/953,738, filed Apr. 16, 2018, Han et al.
U.S. Appl. No. 16/286,881, filed Feb. 27, 2019, Yen et al.
U.S. Appl. No. 16/287,062, filed Feb. 27, 2019, Yen et al.
U.S. Appl. No. 16/400,536, filed May 1, 2019, Yen et al.
Office Action dated Mar. 30, 2022 from German Patent Office for German Patent Application No. 102020134442.2; 6 Pages.

* cited by examiner

RADIANT HEATING DUAL ROLLER SHADE FOR VEHICLE SUNROOF SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to sunroof systems for vehicles, and more particularly to a dual roller shade including a radiant heating shade and a blocking shade for a vehicle sunroof system.

Vehicles often include a sunroof to let natural light and/or fresh air into a passenger compartment. However, the sunroof causes significant heat loss when the vehicle operates in cold ambient temperatures. Some vehicles may include a sunroof shade that can be used to block light.

SUMMARY

A radiant heating and blocking shade system for a sunroof of a vehicle includes a first roller configured to be mounted adjacent to one end of a sunroof of a vehicle. A second roller is mounted adjacent to the first roller between the first roller and the sunroof. A radiant heating shade is at least partially wound around the first roller. The radiant heating shade has a deployed position and a retracted position. A blocking shade is at least partially wound around the second roller. The blocking shade has a deployed position and a retracted position. The blocking shade is arranged parallel to and spaced from the radiant heating shade between the radiant heating shade and the sunroof when the blocking shade and the radiant heating shade are in the deployed position.

In other features, the blocking shade includes a reflective layer on a first surface of the blocking shade. The blocking shade includes an insulating layer on a second surface of the blocking shade. The reflective layer comprises aluminum foil.

In other features, the first surface faces the sunroof when the blocking shade is deployed. The second surface faces the radiant heating shade when the blocking shade and the radiant heating shade are deployed. A hinge removably connects ends of the radiant heating shade and the blocking shade together.

In other features, a first support member is arranged on one side of the sunroof. A second support member arranged on an opposite side of the sunroof. The first roller and the second roller are rotatably attached to the vehicle by the first support member and the second support member.

In other features, at least one of an ambient temperature sensor senses an ambient temperature and a solar load sensor senses a solar load. A first motor is configured to move the radiant heating shade between the retracted position and the deployed position. A second motor configured to move the blocking shade between the retracted position and the deployed position.

In other features, a controller is configured to move one or both of the radiant heating shade and the blocking shade between the retracted position and the deployed position based on at least one of ambient temperature and a solar load. An environmental sensor senses an environmental parameter. A first motor is configured to move the radiant heating shade between the retracted position and the deployed position. A second motor is configured to move the blocking shade between the retracted position and the deployed position. A controller is configured to move one or both of the radiant heating shade and the blocking shade between the retracted position and the deployed position based on the environmental parameter.

In other features, a first motor is configured to move the radiant heating shade between the retracted position and the deployed position. A first switch is configured to start and stop the first motor. A second motor is configured to move the blocking shade between the retracted position and the deployed position. A second switch is configured to start and stop the second motor.

A radiant heating and blocking shade system for a sunroof of a vehicle includes a first roller configured to be mounted adjacent to one end of a sunroof of a vehicle. A second roller is mounted adjacent to the first roller between the first roller and the sunroof. A radiant heating shade is at least partially wound around the first roller. The radiant heating shade has a deployed position and a retracted position. A blocking shade is at least partially wound around the second roller. The blocking shade has a deployed position and a retracted position. The blocking shade is arranged parallel to and spaced from the radiant heating shade between the radiant heating shade and the sunroof when the blocking shade and the radiant heating shade are in the deployed position. The blocking shade includes a reflective layer on a first surface of the blocking shade and an insulating layer on a second surface of the blocking shade. A first motor is configured to move the radiant heating shade between the retracted position and the deployed position. A first switch is configured to start and stop the first motor. A second motor is configured to move the blocking shade between the retracted position and the deployed position. A second switch is configured to start and stop the second motor.

A radiant heating and blocking shade system for a sunroof of a vehicle includes a first roller configured to be mounted adjacent to one end of a sunroof of a vehicle. A second roller is mounted adjacent to the first roller between the first roller and the sunroof. A radiant heating shade is at least partially wound around the first roller. The radiant heating shade has a deployed position and a retracted position. A blocking shade is at least partially wound around the second roller. The blocking shade has a deployed position and a retracted position. The blocking shade is arranged parallel to and spaced from the radiant heating shade between the radiant heating shade and the sunroof when the blocking shade and the radiant heating shade are in the deployed position. The blocking shade includes a reflective layer on a first surface of the blocking shade and an insulating layer on a second surface of the blocking shade. An environmental sensor to sense an environmental parameter. A first motor is configured to move the radiant heating shade between the retracted position and the deployed position. A second motor is configured to move the blocking shade between the retracted position and the deployed position. A controller is configured to move one or both of the radiant heating shade and the blocking shade between the retracted position and the deployed position based on the environmental parameter.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Systems and methods according to the present disclosure relate to a dual roller shade including a radiant heating shade and a blocking shade for vehicles including a sunroof system. The radiant heating shade is wound around one of the rollers when not in use. The blocking shade is wound around another one of the rollers when not in use.

When needed, the radiant heating shade is deployed over occupants of the vehicle with or without the blocking shade. The blocking shade may also be deployed over occupants of the vehicle (with or without the radiant heating shade). The blocking shade provides thermal insulation. In addition, the blocking shade prevents radiation heat loss to the sunroof during the cold weather and reflects solar load through the sunroof during the hot weather.

Radiant heating provides occupant heating comfort. When ambient temperatures are above a first temperature threshold or between the first temperature threshold and a second temperature threshold, the radiant heating shade is turned off and the blocking shade is selectively deployed to block a solar load. When ambient temperatures are below the second temperature threshold, the radiant heating shade is turned on and the blocking shade is selectively deployed depending on a solar load.

In some examples, the vehicle includes an internal combustion engine (ICE) and/or electric motor. In some examples, the vehicle is an electric vehicle (EV) without an internal combustion engine. For EV and ICE applications, the radiant heating shade can be used to improve efficiency. In addition, the radiant heating shade operates quietly, which improves the user experience.

Figure 1:
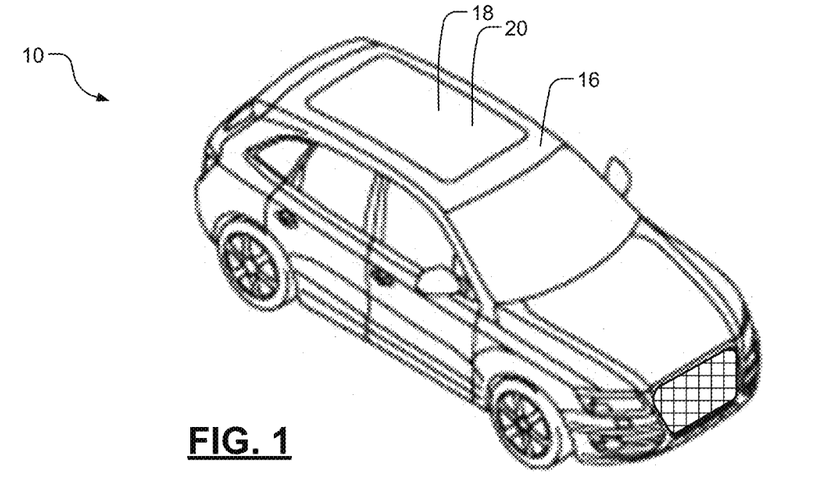
FIG. 1 is a perspective view of an example of a vehicle including a sunroof according to the present disclosure.
Figure 2:
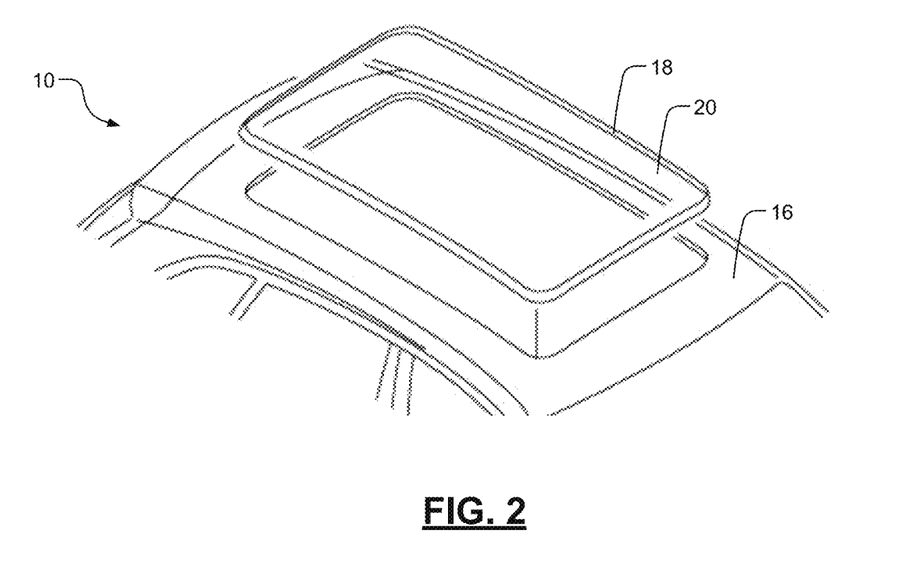
FIG. 2 is an enlarged perspective view of a sunroof of the vehicle of FIG. 1.
Figure 3:
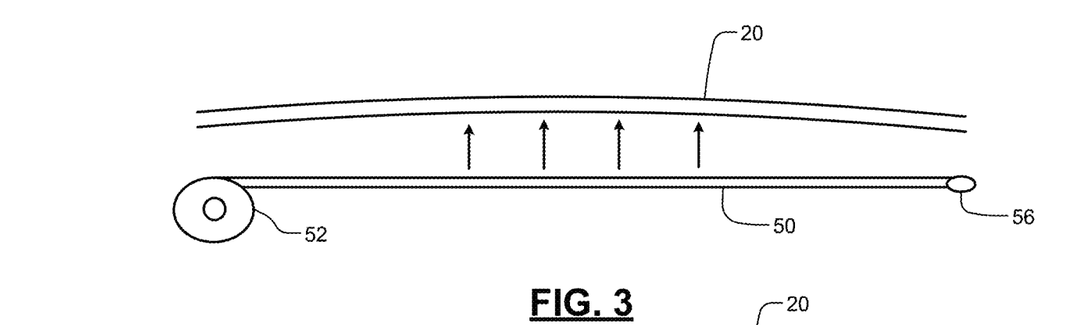
FIG. 3 is a side cross-sectional view of an example of a sunroof and a radiant heating shade.

Referring now to FIGS. 1 to 3, an example of a radiant heating dual roller shade for a vehicle 10. In FIGS. 1 and 2, the vehicle 10 includes a roof 16 and a sunroof system 18 including a transparent substrate 20 such as glass.

In FIG. 3, a radiant heating shade 50 is shown in a deployed position. One end of the radiant heating shade 50 is attached to a roller 52. Additional details relating to an example of the radiant heating shade 50 can be found in commonly-assigned U.S. patent application Ser. No. 15/953, 738, filed on Apr. 16, 2018, which is hereby incorporated by reference in its entirety. The radiant heating shade 50 generates heat when power is applied to the radiant heating shade 50.

A handle portion 56 is optionally attached to an opposite end of the radiant heating shade 50. When the vehicle 10 experiences cold ambient temperature (e.g. −20° C.), the radiant heating shade 50 experiences large radiation heat loss from the radiant heating shade 50 to the transparent material 20.

Figure 4:
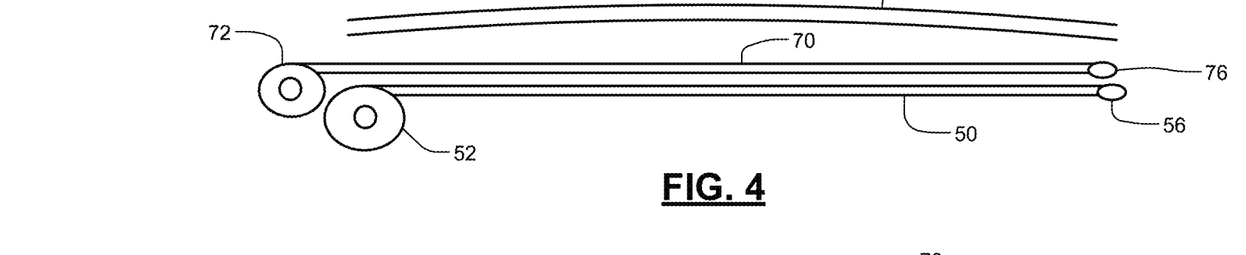
FIG. 4 is a side cross-sectional view of an example of a sunroof, a radiant heating shade and a blocking shade according to the present disclosure.

Referring now to FIG. 4, one end of a blocking shade 70 is attached to a roller 72. A handle portion 76 is optionally attached to an opposite end of the blocking shade 70. The blocking shade 70 is arranged in a plane generally parallel to the radiant heating shade 50 when both are in deployed positions.

Figure 5:
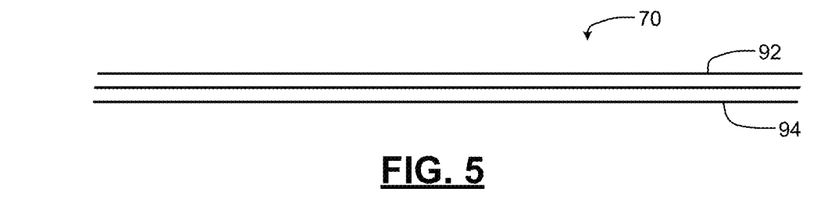
FIG. 5 is a side cross-sectional view of an example of the blocking shade according to the present disclosure.

Referring now to FIG. 5, the blocking shade 70 is shown in further detail to include a first layer 92 and a second layer 94. In some examples, the first layer 92 faces the sunroof glass 20 when the insulating layer 70 is deployed. In some examples, the first layer 92 includes reflective material. In some examples, the first layer 92 includes foil made of aluminum, gold or another thin, reflective material. The first reflective layer blocks solar load during hot summer weather and also reduces radiation heat loss to the cold sunroof during the winter weather. In some examples, the second layer 94 includes an insulating material.

Figure 6:
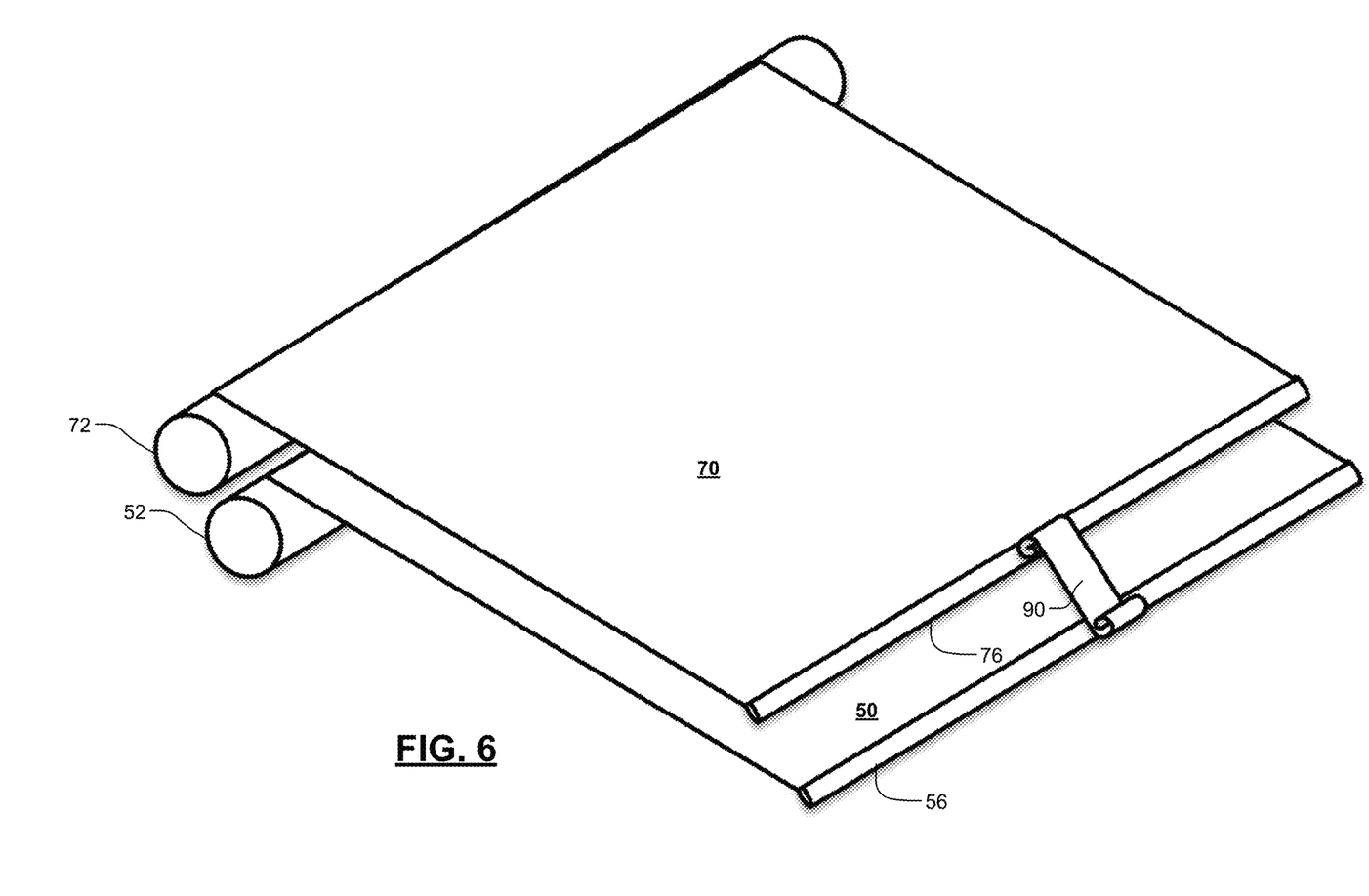
FIG. 6 is a perspective view of an example of a sunroof, a radiant heating shade and a blocking shade according to the present disclosure.

Referring now to FIG. 6, the radiant heating shade 50 and the blocking shade 70 are shown in deployed positions. The blocking shade 70 is located between the radiant heating shade 50 and the sunroof glass 20. A hinge or connector 90 may be used to attach the blocking shade 70 to the radiant heating shade 50 so that they can be moved together to and from the deployed position and/or the retracted position (and positions therebetween).

Figure 7:
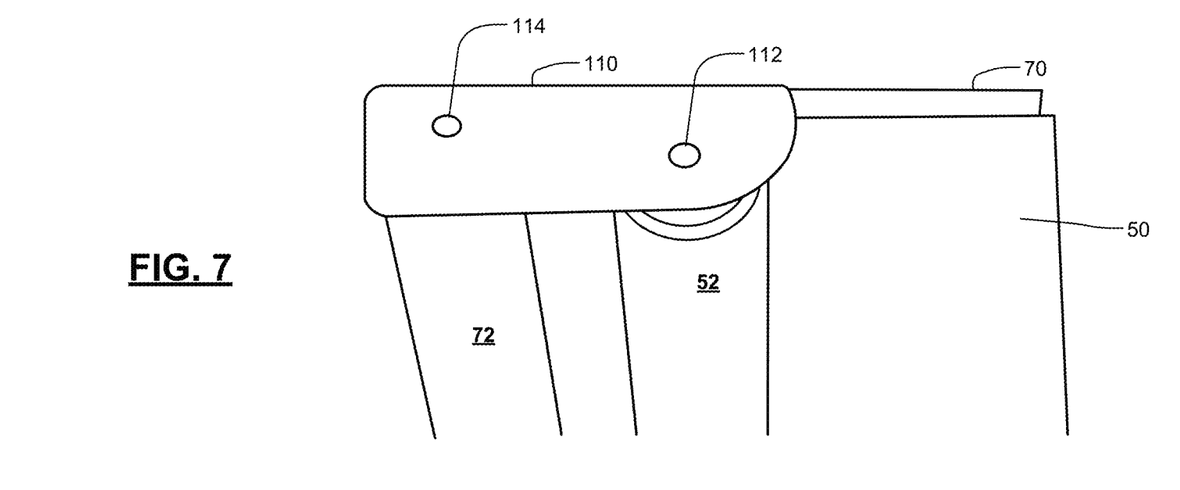
FIG. 7 is a perspective view of an example of a support member for supporting the radiant heating shade and the blocking shade according to the present disclosure.

Referring now to FIG. 7, a support member 110 for supporting the radiant heating shade 50 and the blocking shade 70 are shown. The radiant heating shade 50 is wound around a roller 112 supported between support members 110 located on opposite lateral sides of the vehicle. The blocking shade 70 is wound around a roller 114 supported between support members 110 located on opposite lateral sides of the vehicle 10.

Figure 8:
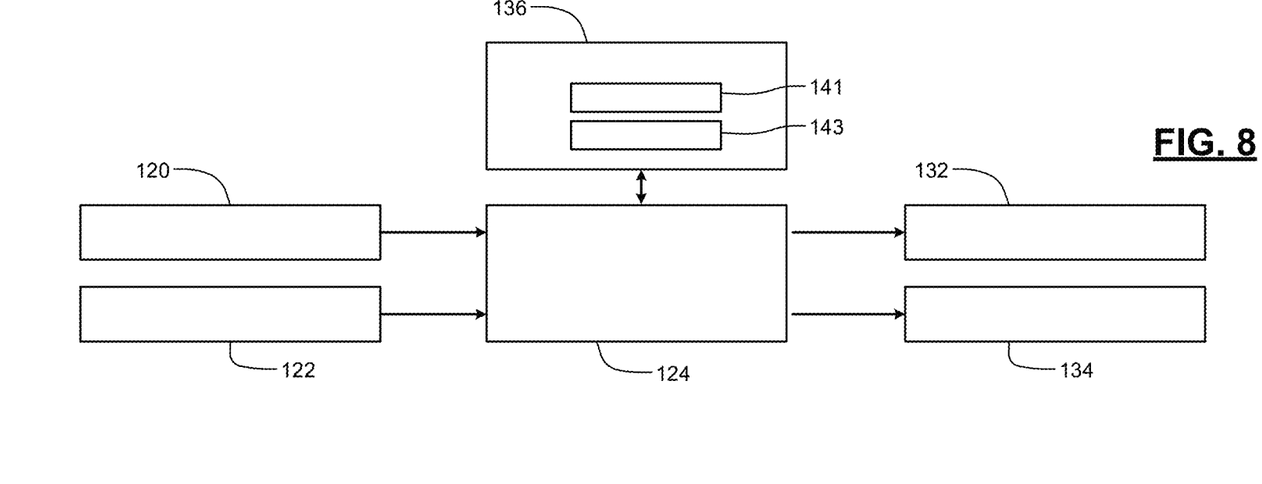
FIG. 8 is a functional block diagram of a controller for operating the radiant heating shade and the blocking shade according to the present disclosure.

Referring now to FIG. 8, the radiant heating shade 50 and the blocking shade 70 can be deployed and/or retracted in response to user input and/or automatically deployed and/or retracted by a controller 124 and motors. The controller 124 communicates with one or more environmental sensors that sense environmental parameters (such as an ambient temperature sensor 120, a solar load sensor 122 or another sensor), the radiant shade motor 132, a blocking shade motor 134, and a control device 136 (including a first switch 141 and/or a second switch 143).

In some examples, the radiant shade motor 132 and the blocking shade motor 134 are coupled directly or indirectly (by a drive mechanism) to edges of the handle portions 56 and 76 of the radiant heating shade 50 and the blocking shade 70 and/or to the rollers 112 and 114. The control device 136 may be used to manually control positions of the radiant heating shade 50 and/or the blocking shade 70. In some examples, the first switch 141 and the second switch 143 can be used to control the radiant shade motor 132 and the blocking shade motor 134, respectively.

Figure 9:
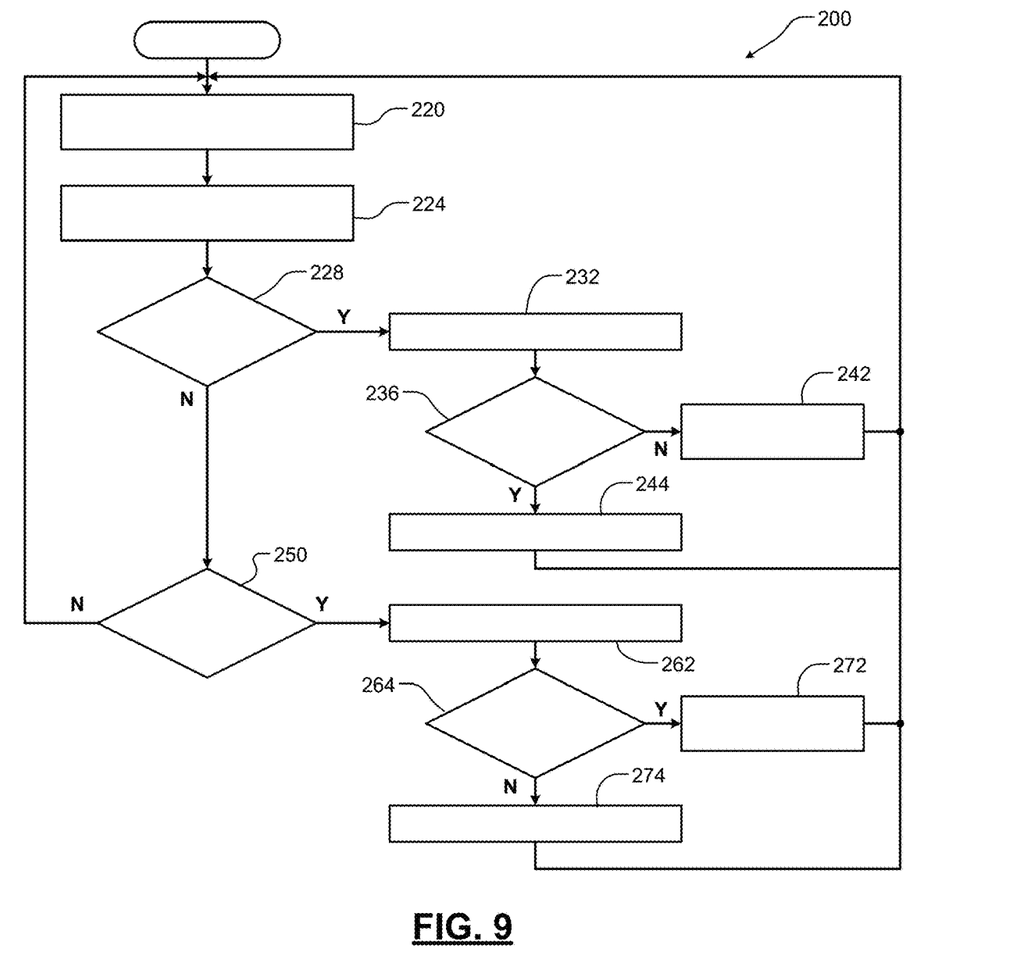
FIG. 9 is a flowchart of a method for operating the radiant heating shade and the blocking shade according to the present disclosure.

Referring now to FIG. 9, a method 200 for operating the radiant heating shade 50 and the blocking shade 70 is shown. At 220, the method determines the ambient temperature. At 224, the method determines a solar load or intensity. At 228, the method determines whether $T_{cold} < T_{amb} < T_{hot}$ or $T_{amb} > T_{hot}$, where $T_{cold}$ is a cold threshold temperature, $T_{amb}$ is an ambient temperature, and $T_{hot}$ is a hot threshold temperature.

If 228 is true, the method turns off the radiant heat at 232. At 236, the method determines whether the solar load is greater than or equal to a solar load threshold. If 236 is false, the method continues with 242 and retracts the blocking shade. If 236 is true, the method continues at 244 and deploys the blocking shade.

If 228 is false, the method continues at 250. At 250, the method determines whether the $T_{amb}$ is less than $T_{cold}$. If 250 is false, the method continues at 220. At 250 is true, the method continues at 262 and the radiant heat is turned on. At 264, the method determines whether the solar load is greater than or equal to a solar load threshold. If 264 is true, the method continues with 272 and retracts the blocking shade. If 264 is false, the method continues at 274 and deploys the blocking shade.

Figure 10:
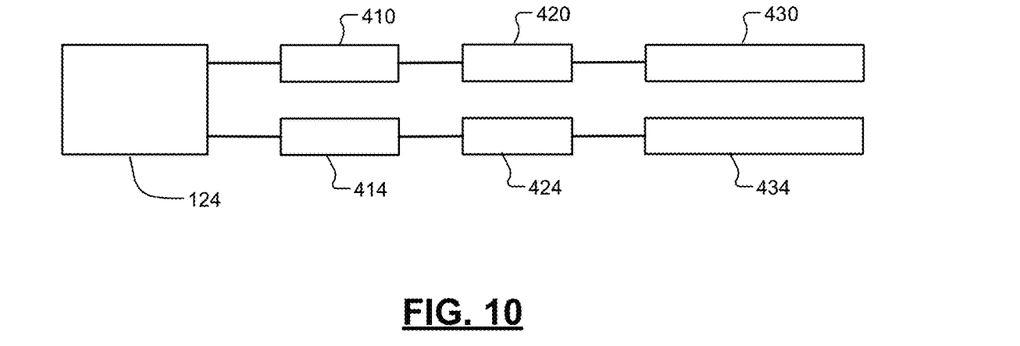
FIG. 10 is a functional block diagram of an example of a controller to automatically control positions of the radiant heating shade and the blocking shade.

Referring now to FIG. 10, the controller 124 controls one or more motors 410, 414 which are coupled by drive mechanisms 420, 424 to a radiant heating shade 430 and a blocking shade 434. In some examples, the drive mechanisms 420, 424 may include one or more gears, drive shafts, drive wires or chains, tracks, etc. that couple the motors 410, 414 to the radiant heating shade 430 and the blocking shade 434, respectively. The controller 124 automatically operates the radiant heating shade 430 and the blocking shade 434 as described above.

The dual roller shade described herein improves occupant thermal comfort by minimizing the heat loss to the sunroof. The dual roller shade described herein satisfies surface temperature requirements by radiation heat loss to the sunroof. The dual roller shade described herein satisfies tight packaging requirements. In some examples, there can be up to 30% HVAC energy savings for EV applications. The efficiency improvement can significantly increase EPA driving range. In some examples, the dual shade roller described herein can provide an increase in driving range of up to 16 miles (up from 238 miles).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A radiant heating and blocking shade system for a sunroof of a vehicle, comprising:
  a first roller configured to be mounted adjacent to one end of the sunroof of the vehicle;
  a second roller mounted adjacent to the first roller between the first roller and the sunroof;
  a radiant heating shade that generates heat when power is applied to the radiant heating shade and that is at least partially wound around the first roller, wherein the radiant heating shade has a deployed position and a retracted position;
  a blocking shade at least partially wound around the second roller, wherein the blocking shade has a deployed position and a retracted position,
  wherein the blocking shade is arranged parallel to and spaced from the radiant heating shade between the radiant heating shade and the sunroof when the blocking shade and the radiant heating shade are in the deployed position; and
  an ambient temperature sensor configured to measure an ambient temperature outside of the vehicle;
  a controller configured to:
    disconnect the radiant heating shade from power and deploy the blocking shade when the ambient temperature outside of the vehicle is greater than a first temperature threshold;
    retract the blocking shade when a solar load is less than a solar load threshold;
    deploy the blocking shade when the solar load is greater than the solar load threshold; and
    apply power to the radiant heating shade when the ambient temperature outside of the vehicle is less than a second temperature threshold.

2. The radiant heating and blocking shade system of claim 1, wherein the blocking shade includes a reflective layer on a first surface of the blocking shade.

3. The radiant heating and blocking shade system of claim 2, wherein the blocking shade includes an insulating layer on a second surface of the blocking shade.

4. The radiant heating and blocking shade system of claim 2, wherein the reflective layer comprises aluminum foil.

5. The radiant heating and blocking shade system of claim 3, wherein the first surface faces the sunroof when the blocking shade is deployed.

6. The radiant heating and blocking shade system of claim 5, wherein the second surface faces the radiant heating shade when the blocking shade and the radiant heating shade are deployed.

7. The radiant heating and blocking shade system of claim 1, further comprising a hinge to removably connect ends of the radiant heating shade and the blocking shade together.

8. The radiant heating and blocking shade system of claim 1, further comprising:
  a first support member arranged on one side of the sunroof; and
  a second support member arranged on an opposite side of the sunroof,
  wherein the first roller and the second roller are rotatably attached to the vehicle by the first support member and the second support member.

9. The radiant heating and blocking shade system of claim 1, further comprising a solar load sensor to sense the solar load.

10. The radiant heating and blocking shade system of claim 1, further comprising a first motor configured to move the radiant heating shade between the retracted position and the deployed position.

11. The radiant heating and blocking shade system of claim 10, further comprising a second motor configured to move the blocking shade between the retracted position and the deployed position.

12. The radiant heating and blocking shade system of 1, further comprising a first motor configured to move the radiant heating shade between the retracted position and the deployed position.

13. The radiant heating and blocking shade system of claim 12, further comprising a second motor configured to move the blocking shade between the retracted position and the deployed position.

14. The radiant heating and blocking shade system of claim 1, further comprising:

a first motor configured to move the radiant heating shade between the retracted position and the deployed position; and a first switch configured to start and stop the first motor.

15. The radiant heating and blocking shade system of claim 14, further comprising:

a second motor configured to move the blocking shade between the retracted position and the deployed position; and a second switch configured to start and stop the second motor.

16. A radiant heating and blocking shade system for a sunroof of a vehicle, comprising:

a first roller configured to be mounted adjacent to one end of the sunroof of the vehicle;

a second roller mounted adjacent to the first roller between the first roller and the sunroof;

a radiant heating shade that generates heat when power is applied to the radiant heating shade and that is at least partially wound around the first roller, wherein the radiant heating shade has a deployed position and a retracted position;

a blocking shade at least partially wound around the second roller, wherein the blocking shade has a deployed position and a retracted position, wherein the blocking shade is arranged parallel to and spaced from the radiant heating shade between the radiant heating shade and the sunroof when the blocking shade and the radiant heating shade are in the deployed position, and wherein the blocking shade includes a reflective layer on a first surface of the blocking shade and an insulating layer on a second surface of the blocking shade, a first motor configured to move the radiant heating shade between the retracted position and the deployed position;

a first switch configured to start and stop the first motor;

a second motor configured to move the blocking shade between the retracted position and the deployed position;

a second switch configured to start and stop the second motor;

an ambient temperature sensor configured to measure an ambient temperature outside of the vehicle; and a controller configured to:

disconnect the radiant heating shade from power and deploy the blocking shade when the ambient temperature outside of the vehicle is greater than a first temperature threshold;

via the second motor retract the blocking shade when a solar load is less than a solar load threshold;

via the second motor deploy the blocking shade when the solar load is greater than the solar load threshold; and apply power to the radiant heating shade when the ambient temperature outside of the vehicle is less than a second temperature threshold.

17. A radiant heating and blocking shade system for a sunroof of a vehicle, comprising:

a first roller configured to be mounted adjacent to one end of the sunroof of the vehicle;

a second roller mounted adjacent to the first roller between the first roller and the sunroof;

a radiant heating shade that generates heat when power is applied to the radiant heating shade and that is at least partially wound around the first roller, wherein the radiant heating shade has a deployed position and a retracted position;

a blocking shade at least partially wound around the second roller, wherein the blocking shade has a deployed position and a retracted position, wherein the blocking shade is arranged parallel to and spaced from the radiant heating shade between the radiant heating shade and the sunroof when the blocking shade and the radiant heating shade are in the deployed position, and wherein the blocking shade includes a reflective layer on a first surface of the blocking shade and an insulating layer on a second surface of the blocking shade;

an environmental sensor to sense an environmental parameter;

a first motor configured to move the radiant heating shade between the retracted position and the deployed position;

a second motor configured to move the blocking shade between the retracted position and the deployed position;

an ambient temperature sensor configured to measure an ambient temperature outside of the vehicle; and a controller configured to move one or both of the radiant heating shade and the blocking shade between the retracted position and the deployed position based on the environmental parameter, the controller configured to:

disconnect the radiant heating shade from power and deploy the blocking shade when the ambient temperature outside of the vehicle is greater than a first temperature threshold;

retract the blocking shade when a solar load is less than a solar load threshold;

deploy the blocking shade when the solar load is greater than the solar load threshold; and apply power to the radiant heating shade when the ambient temperature outside of the vehicle is less than a second temperature threshold.

\* \* \* \* \*